(12) United States Patent
Fontana et al.

(10) Patent No.: US 8,270,063 B2
(45) Date of Patent: Sep. 18, 2012

(54) ENCAPSULATED DISPERSIONS COMPRISING ELECTROPHORETICALLY MOBILE ORGANIC COLORANTS

(75) Inventors: Margherita Fontana, Basel (CH); Gerardus De Keyzer, Riehen (CH); Philippe Bugnon, Le Mouret (CH); Marcel Hahn, Magden (CH); Kishor Kumar Mistry, Clayton (GB); Clemens Auschra, Freiburg (DE)

(73) Assignee: BASF SE, Ludwigshafen (DE)

( * ) Notice: Subject to any disclaimer, the term of this patent is extended or adjusted under 35 U.S.C. 154(b) by 294 days.

(21) Appl. No.: 12/676,765

(22) PCT Filed: Aug. 28, 2008

(86) PCT No.: PCT/EP2008/061266
§ 371 (c)(1),
(2), (4) Date: Jun. 2, 2010

(87) PCT Pub. No.: WO2009/030628
PCT Pub. Date: Mar. 12, 2009

(65) Prior Publication Data
US 2010/0290103 A1 Nov. 18, 2010

(30) Foreign Application Priority Data
Sep. 7, 2007 (EP) .................................. 07115939

(51) Int. Cl.
G02B 26/00 (2006.01)
G03G 17/04 (2006.01)
G09G 3/34 (2006.01)
G02F 1/133 (2006.01)

(52) U.S. Cl. ............. 359/296; 430/32; 345/107; 349/33

(58) Field of Classification Search .................. 359/296; 345/49, 105, 107; 430/31, 32; 349/33; 204/405, 204/600; 250/70, 208.1; 438/929
See application file for complete search history.

(56) References Cited

U.S. PATENT DOCUMENTS

| 4,686,287 | A | * | 8/1987 | Hunger ........................ 534/742 |
| 5,432,445 | A | | 7/1995 | Dinsmore et al. |
| 5,460,817 | A | | 10/1995 | Langley et al. |
| 7,005,461 | B2 | * | 2/2006 | Sanada et al. ................. 523/160 |
| 2004/0218252 | A1 | | 11/2004 | Motoi et al. |
| 2004/0257330 | A1 | | 12/2004 | Minami |
| 2005/0156340 | A1 | | 7/2005 | Valianatos et al. |
| 2006/0007528 | A1 | | 1/2006 | Cao et al. |

FOREIGN PATENT DOCUMENTS

| DE | 35 40 796 | 4/1987 |
|---|---|---|
| EP | 0 051 830 | 5/1982 |
| EP | 0 640 603 | 3/1995 |
| EP | 0 876 413 | 11/1998 |
| EP | 1 071 681 | 1/2001 |
| EP | 1 275 689 | 1/2003 |
| EP | 1 358 275 | 11/2003 |
| JP | 2003 330179 | 11/2003 |
| JP | 2004 117934 | 4/2004 |
| WO | 00 24736 | 5/2000 |
| WO | 00 40630 | 7/2000 |
| WO | 01 04215 | 1/2001 |
| WO | 01 54809 | 8/2001 |
| WO | 02 35502 | 5/2002 |
| WO | 03 046029 | 6/2003 |
| WO | 2004 067593 | 8/2004 |
| WO | 2004 068234 | 8/2004 |
| WO | 2005 105291 | 11/2005 |
| WO | 2006 038731 | 4/2006 |
| WO | 2006 074969 | 7/2006 |
| WO | 2007 045312 | 4/2007 |
| WO | 2007 048721 | 5/2007 |
| WO | 2008 003619 | 1/2008 |

* cited by examiner

Primary Examiner — Dwayne A Pinkney
(74) Attorney, Agent, or Firm — Oblon, Spivak, McClelland, Maier & Neustadt, L.L.P.

(57) ABSTRACT

The invention relates to an electrophoretic display, comprising electrodes and cells containing at least one kind of ionic, monochrome particles, a non-polar liquid and a dispersant, wherein the ionic, monochrome particles of at least one kind are essentially aggregates consisting of a carbon containing pigment and a cationic pigment orcationic pigment derivative, and the dispersantis selected from the group consisting of polyacrylates, polyesters, polyurethanes and copolymers, with the proviso that the cationic pigment or cationic pigment derivative is not a reaction product of carbonblack with diazotated procaine hydrochloride. In general, the whole quantity of the pigment and the main part, preferably at least 80%, most preferred from 95% to 100%, of the whole cationic pigment or cationic pigment derivative present within the cells is comprised in the aggregates, with essentially no pigment and only a minor part of the cationic pigment or cationic pigment derivative physically distinct from the aggregates.

14 Claims, No Drawings

ENCAPSULATED DISPERSIONS COMPRISING ELECTROPHORETICALLY MOBILE ORGANIC COLORANTS

Electrophoretic displays are gaining increased importance, for example as an alternative to liquid crystal displays. However, a fully satisfactory full colour system is not yet available. Thus, it is desirable to improve this promising technology.

JP-A-2003/330 179 discloses photosensitive recording materials suitable for electrophoresis, which comprise organic pigments optionally surface-treated with polymers, titanates or silanes, for example through graft polymerisation.

JP-A-2004/117 934 teaches to use mixtures of pigments having different particle size distributions, one of the pigments being in the range from 0.04 to 0.3 µm. These mixtures are incorporated into chargeable particles used in an electric insulating solvent. In one example, titanium dioxide is ground with Isopar® L (mixture of $C_{10}$-$C_{12}$ isoalkanes [STN registry no. 65072-03-9]) and Bontron® P-51 (triethyl-benzyl-ammonium 4-hydroxy-naphtyl-1-sulfonate [STN registry no. 100783-78-6]) to produce positively charged particles.

A similar idea is disclosed in US-A-2004/0 218 252 (the terminology used therein does not match the usual meaning of "granules" and "particles"). For example, pigments of average primary particle size from 10 to 50 nm are combined with other pigments of average primary particle size from 100 to 700 nm. However, the polymeric granules wherein these pigments are embedded have a much greater size of 1 to 3 µm, which is difficult to control precisely.

WO 2004/067 593 discloses desorption of dispersing agents adsorbed on the electrophoretic particles to be a display quality problem, resolvable through graft polymerisation of a reactive surfactant to fix amphipathic residual groups onto the surface of the electrophoretic particles, which may contain organic pigments. Examples of reactive surfactants are $CH_2$=CH—$(CH_2)_9$—$OSO_3Na$ and $CH_2$=C($CH_3$)—COO—$CH_2CH_2$—$N^+(CH_3)_2$—$(CH_2)_{11}CH_3 \cdot Br^-$.

WO 2004/068 234 discloses non-aqueous electrophoretic capsules comprising a halogenated polymeric shell. A number of possible components are disclosed, including preferably nonionic and polyfluorinated dyes as well as organic pigments, either as such or encapsulated. However, the colorants are used in the liquid phase and should have a colour contrast to the primary colour particles. There is also no mention nor suggestion of sulfonates or sulfates to be used as a surface treatment.

WO 02/35 502 discloses gyricon displays containing modified, at least bichromal particles of size range from about 0.05 µm to about 100 µm, in which the interaction of the ball or element with the surrounding materials is minimized so that there is no need for suspension aids. In the only detailed embodiment, the particles are polymer coated. However, gyricon displays have an undesirably slow response to the control electric field because the bichromal particles of relatively high mass must rotate and the relatively low specific surface area further leads to a relatively low charge/mass ratio.

WO 2006/038 731 discloses a conventional, high contrast colour filter for liquid crystal displays, which is manufactured from photocurable pigments dispersions comprising pigments of size 0.001-0.1 µm.

WO 2007/048 721 discloses functionalized inorganic particles to which an organic chromophore is attached with a silicium-alkyl group and their use in electrophoretic displays.

PCT/EP2007/056 387 is a patent application according to Art. 54(3) EPC and Rule 64.3 PCT, which is directed to encapsulated electrophoretic dispersions comprising pigments and anionic pigment derivatives. Cationic carbon black (C. I. Pigment Black 7) is disclosed in example 24.

Hence, the coloristic and/or electrophoretic properties of prior art electrophoretic displays still need improvements to compete successfully with other technologies. Furthermore, the precise control of the particle size distribution of primary pigment particles embedded in a polymeric granule is difficult and affected by dispersibility and aggregation problems, with the additional problem that the electrophoretic properties must remain satisfactory. Especially desirable is a multicolour electrophoretic display with high colour saturation, high colour strength and enhanced light stability, which is yet not available.

A new idea has now been developed, which provides electrophoretically highly mobile pigments having a precise electrical charge per unit of weight as well as precise dimensions. This approach provides surprisingly improved results with pigments comprising carbon atoms, such as carbon black and especially synthetic colour organic pigments comprising aromatic or heteroaromatic groups.

Thus, the invention relates to an electrophoretic display, comprising electrodes and cells containing at least one kind of ionic, monochrome particles, a non-polar liquid and a dispersant, wherein the ionic, monochrome particles of at least one kind are essentially aggregates consisting of a carbon containing pigment and a cationic pigment or cationic pigment derivative, and the dispersant is selected from the group consisting of polyacrylates, polyesters, polyurethanes and copolymers, with the proviso that the cationic pigment or cationic pigment derivative is not a reaction product of carbon black with diazotated procaine hydrochloride.

Preferably, the pigment core on which the cationic pigment or cationic pigment derivative is based on the core of an organic pigment, not on carbon black.

Generally, the cells comprise monochrome particles of 1, 2, 3, 4 or 5 kinds, but it is not necessary that all kinds of monochrome particles are essentially aggregates consisting of a carbon containing pigment and a cationic pigment or cationic pigment derivative. On the contrary, ionic, monochrome particles of different kinds may comprise pigment derivatives of different polarities. The monochrome particles of different kinds preferably have different colours.

The monochrome particles which are essentially aggregates consisting of a carbon containing pigment and a cationic pigment or cationic pigment derivative can comprise further components, such as impurities or additives, as long as these do not affect the aggregation of the pigment and cationic pigment or cationic pigment derivative.

When the dispersant is a copolymer, it can have any known polymer architecture such as a block, gradient, graft and/or random copolymer. Preferred are block copolymers or graft copolymers, most preferred block copolymers, especially block copolymers obtained by transesterification as disclosed in WO 2006/074 969. Preferably, the dispersant is a polyacrylate or a copolymer build from at least two ingredients selected from the group consisting of acrylate, ester and urethane ingredients, most preferably at least one acrylate.

Suitably, the dispersant comprises polar as well as apolar or low polar ingredients. Preferably, the polar ingredients are selected from the group consisting of ingredients comprising a nitrogen atom and ingredients comprising an aromatic ring, and the apolar or low polar ingredients are selected from the group consisting of acrylic acid esters, methacrylic acid esters, allyl esters and vinyl esters, the ester group of which comprises from 1 to 24 carbon atoms and optionally from 1 to 12 oxygen and/or silicon atoms, allyl and vinyl $C_1$-$C_{24}$alkyl ethers, styrene, $C_1$-$C_{24}$alkyl-substituted styrenes, $C_4$-$C_{12}$lactones and hydroxy-$C_2$-$C_{24}$acids.

Examples of suitable ingredients comprising a nitrogen atom or an aromatic ring are in particular primary, secondary and tertiary mono-, oligo- or polyamines, primary and secondary amides, saturated, unsaturated and aromatic N-heterocycles, and phenyl and naphthyl groups, such as amino-functional (meth)acrylates like dimethylaminoethyl acrylate, dimethylaminoethyl methacrylate, dimethylaminopropyl methacrylamide, tert.-butylaminoethylmethacrylate, 2-, 3- or 4-vinylpyridine, 4-dimethylaminostyrene, N-vinylimidazole or salts thereof with organic or inorganic acids; N-vinyl-2-pyrrolidone; benzyl(meth)acrylate; dimethylacrylamide; 2-(2-oxo-1-imidazolidinyl)ethyl methacrylate; adducts of aminic or aromatic compounds with glycidylmethacrylate; polyethylene imine; polyallylamine; polyvinylamine; N-dimethylaminoethanol; N-diethylaminoethanol; ethylene diamine; 3-N-dimethylaminopropylamine; diethylenetriamine; triethylenetetramine; tetraethylenepentamine; 3-aminopropyl-imidazole and N-(2-hydroxyethyl)morpholine.

As is apparent from above list, the ingredients comprising a nitrogen atom or an aromatic ring can optionally additionally comprise further functionality, such as additional nitrogen and/or oxygen atoms. Especially preferred polar ingredients are polyethyleneimine, N-diethylaminoethanol, 3-aminopropylimidazol and substituted or unsubstituted vinylpyridin. It is also suitable to use the ingredients comprising a nitrogen atom in combination with elements lacking a nitrogen atom, such as in combination with styrene, thus leading to copolymeric polar building blocks.

Examples of suitable (meth)acrylates (that is, acrylates or methacrylates) are for example (meth)acrylates of $C_1$-$C_{24}$ saturated or $C_3$-$C_{24}$ unsaturated, linear or branched, aliphatic or unsaturated alcohols; of $C_7$-$C_{24}$ aralkyl alcohols, such as methyl(meth)acrylate, butyl(meth)acrylate, isobutyl(meth)acrylate, tert.-butyl(meth)acrylate, 2-ethylhexyl(meth)acrylate, isodecyl(meth)acrylate, stearyl(meth)acrylate, oleyl(meth)acrylate and phenethyl(meth)acrylate; (meth)acrylates of alcohols which contain one or more ether linkages, such as (meth)acrylates of 2-phenoxyethanol or ethylene oxide or propylene oxide adducts, like butyl glycol, butyl diglycol, ethyltriglycol or methoxy- or ethoxypolyethyleneglycols of molecular weights from 300 to 3000; (meth)acrylates of polyols which optionally contain one or more ether linkages, such as or (meth)acrylates of glycols, for example 2-hydroxyethanol or 2-hydroxypropanol, or of oligosilicone alcohols, for example OH-endfunctional polydimethylsilicone of molecular weight from 300 to 5000.

Preferred (meth)acrylates are obtained from mixtures containing monomers selected from butyl acrylate and (meth)acrylates of at least partly branched long chain aliphatic $C_{10}$-$C_{18}$ alcohols, in particular from mixtures containing butylacrylate and at least partly branched $C_{12}$-$C_{15}$ alcohols. Most preferred (meth)acrylates are such, which are obtained by controlled free radical polymerisation, in particular as disclosed in WO 2006/074 969.

Examples of suitable $C_1$-$C_{24}$alkyl-substituted styrenes, $C_4$-$C_{12}$lactones and hydroxy-$C_2$-$C_{24}$acids are vinyltoluene or tert.-butylstyrene, ε-caprolactone or δ-valerolactone, and 12-hydroxystearic acid, respectively, preferably 12-hydroxystearic acid.

The apolar or low polar ingredients, for example alkyl, alkoxy or alkylester groups, provide affinity to the non-polar liquid. The polar ingredients comprising a nitrogen atom or an aromatic ring, for example an amino group, a N-heterocyclic group or a phenyl ring, provide affinity to the pigment.

The dispersant has preferably a low number of ionic groups, so that the total number of ionic groups of the dispersant is equal to or lower than the total number of ionic groups of the cationic pigment or cationic pigment derivative. The ratio of ionic groups of the cationic pigment or cationic pigment derivative to ionic groups of the dispersant is preferably at least 1:1, especially at least 5:1. Most preferably, the dispersant is non-ionic.

The dispersant is preferably a block copolymer comprising a chain consisting essentially of a poly(acrylic acid esters and/or methacrylic acid esters) and a chain build with ingredients comprising a nitrogen atom. More preferred, the dispersant is a linear block copolymer consisting essentially of a chain consisting essentially of a poly(acrylic acid esters and/or methacrylic acid esters), a chain build with ingredients comprising a nitrogen atom and two terminal groups. The chain build with ingredients comprising a nitrogen atom is preferably polyethylene imine and/or poly(vinylpyridin), most preferred polyvinylpyridin. The dispersant has preferably a number average molecular weight $M_n$ of about 2000 to 20000, preferably from 3000 to 10000, with from 20 to 150, preferably from 40 to 120 ester groups in the poly(acrylic acid esters and/or methacrylic acid esters) and from 5 to 40, preferably from 10 to 20 aromatic groups in the polyethylene imine and/or poly(vinylpyridin).

Examples of suitable dispersants are disclosed in EP 0 876 413, EP 1 071 681, WO00/40 630, EP 1 275 689, W003/046 029 or WO 2006/074 969, in particular Disperbyk® 2000, Disperbyk® 2001, EFKA® 4300, EFKA® 4340, Solsperse® 17000, Solsperse® 18000 and Noveon™, which are of particular interest in combination with tetrachloroethylene as non-polar liquid. The dispersants according to WO 2006/074 969 are especially preferred also in combination with special solvents of particular relevance for electronic paper, such as aliphatic hydrocarbons, silicone fluids, Isopar™ G, Isopar™ M and Halocarbon™ 0.8, as their solubility and compatibility can be easily adjusted.

The pigment can be inorganic or preferably organic, for example carbon black or pigments of the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone, thioindigo or oxobenzofuranyliden-dihydroindolone series or, including those, where applicable, in the form of metal complexes or lakes, in particular unsubstituted or partially halogenated, oxo- or thio-substituted phthalocyanines such as copper, zinc or nickel phthalocyanines, 1,4-diketo-3,6-diaryl-pyrrolo[3,4-c]pyrroles, dioxazines, isoindolinones, indanthrones, perylenes and quinacridones. Azo pigments can be, for example, mono- or dis-azo pigments from any known subclass, obtainable, for example, by coupling, condensation or lake formation.

Notably useful are the pigments described in the Colour Index, including Pigment Yellow 1, 3, 12, 13, 14, 15, 17, 24, 34, 42, 53, 62, 73, 74, 83, 93, 95, 108, 109, 110, 111, 119, 120, 123, 128, 129, 139, 147, 150, 151, 154, 164, 168, 173, 174, 175, 180, 181, 184, 185, 188, 191, 191:1, 191:2, 193, 194 and 199; Pigment Orange 5, 13, 16, 22, 31, 34, 40, 43, 48, 49, 51, 61, 64, 71, 73 and 81; Pigment Red 2, 4, 5, 23, 48, 48:1, 48:2, 48:3, 48:4, 52:2, 53:1, 57, 57:1, 88, 89, 101, 104, 112, 122, 144, 146, 149, 166, 168, 170, 177, 178, 179, 181, 184, 185, 190, 192, 194, 202, 204, 206, 207, 209, 214, 216, 220, 221, 222, 224, 226, 242, 248, 254, 255, 262, 264, 270 and 272; Pigment Brown 23, 24, 25, 33, 41, 42, 43 and 44; Pigment Violet 19, 23, 29, 31, 37 and 42; Pigment Blue 15, 15:1, 15:2, 15:3, 15:4, 15:6, 16, 25, 26, 28, 29, 60, 64 and 66; Pigment Green 7, 17, 36, 37 and 50; Pigment Black 7, 20, 21, 31 and 32; Vat Red 74; 3,6-di(3',4'-dichloro-phenyl)-2,5-dihydro-pyrrolo[3,4-c]-pyrrole-1,4-dione, 3,6-di(4'-cyano-phenyl)-2,5-dihydro-pyrrolo[3,4-c]pyrrole-1,4-dione, 3-phenyl-6-(4'-tert-butyl-phenyl)-2,5-dihydro-pyrrolo[3,4-c]pyrrole-1,4-dione and the compound according to example 12b of WO00/24 736; and mixtures and solid solutions thereof.

The cationic pigment or cationic pigment derivative is generally a derivative of one of the above-mentioned organic pigments, preferably ammonium or phosphonium, most preferred an ammonium derivative. These groups can either be attached through a linking group, for example a phenylene, naphthylene, alkylene, alkenylene, cycloalkylene, cycloalkenylene, alkynyl, carbonyl, carbonate, ester, amide, ether or thio group, or a chain of up to about 10 such groups, or they are directly bound to an aromatic group of the chromophore. Preferably, ammonium or phosphonium is bound to the pigment through a linking group which is not conjugated or only partially conjugated. The cationic pigment or cationic pigment derivative can alternatively be the protonated form of a pigment or the cationic form of a triphenylmethane colourant. Adequately, the amount of cationic pigment or cationic pigment derivative is from 0.1 to 15% by weight, preferably from 1 to 12% by weight, most preferred from 5 to 10% by weight, calculated as protonated acid form based on the pigment. When there is more than one kind of monochrome particles, this is preferably true for all kinds of monochrome particles.

The cationic pigment or cationic pigment derivative is generally present as a carboxylate, phenolate, sulfate, sulfonate, phosphate, phosphonate, antimonate, borate, halogenide, halogenate or hydroxide salt, preferably a carboxylate salt, whereby the carboxylate, phenolate, sulfate, sulfonate, phosphate, phosphonate, antimonate, borate, halogenide, halogenate or hydroxide ions suitably dissociate from their counter ions in an electric field or a polar liquid medium. Preferably, at least 50%, most preferred from 80% to 100%, of the carboxylate, phenolate, sulfate, sulfonate, phosphate, phosphonate, antimonate, borate, halogenide, halogenate or hydroxide ions dissociate from their counter ions in an electric field or a polar liquid medium. Less dissociation leads to a decrease of the display's efficiency.

The carboxylate, phenolate, sulfate, sulfonate, phosphate, phosphonate, antimonate, borate, halogenide, halogenate or hydroxide counter ions can optionally comprise $C_1$-$C_{24}$alkyl, $C_3$-$C_{24}$cycloalkyl, $C_2$-$C_{24}$alkenyl or $C_3$-$C_{24}$cyclo-alkenyl groups and/or it can be substituted, for example by halogen (especially F).

The counter ions preferably comprise at least one $C_8$-$C_{24}$alkyl group, more preferably at least one $C_{12}$-$C_{24}$alkyl group. Examples of especially suitable counter ions are laurate, palmitate, oleate, stearate, dodecyl sulfate, dodecyl sulfonate, dihexyl phosphate, dicyclohexyl phosphate, dodecyl phosphate, pentafluoro dodecyl phosphate, hexafluorophosphate, dodecyl phosphonate, difluoro dihexyloxy borate, trifluoro dodecyl borate, tetrafluoro borate, tetrahexyloxy borate, fluoride, chloride, perchlorate, bromide, iodide or periodate.

Ammonium or phosphonium cations are for example of the formula

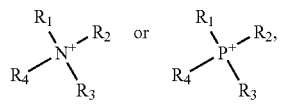

wherein $R_1$ is a direct bond or a link to a pigment radical, which link is composed of one atom or atoms group selected from the group consisting of 1,2-phenylene, 1,3-phenylene, 1,4-phenylene, —$CH_2$—, —$C_2$-$C_6$alkylene—, —$C_3$-$C_6$cycloalkylene—, —C(=O)—, —N($C_1$-$C_4$alkyl)—, —NH—, —S—, —O— and —CH=CH—, or a chain of from 2 to 5 thereof, and $R_2$ is H, $C_1$-$C_{24}$alkyl, $C_2$-$C_{24}$alkenyl or $C_3$-$C_{24}$cycloalkenyl, $R_3$ and $R_4$ are independently from one another H, $C_1$-$C_{12}$alkyl, $C_3$-$C_{12}$cycloalkyl, $C_3$-$C_{12}$cycloalkenyl, $C_6$-$C_{12}$aryl, $C_7$-$C_{12}$aralkyl or [$C_2$-$C_4$alkylene—O]$_n$$R_5$, $R_5$ is H or $C_1$-$C_{12}$alkyl, and n is a number from 1 to 12.

Preferably, $R_1$, $R_2$, $R_3$ and $R_4$ are each independently from the others H, especially $R_1$, $R_2$, $R_3$ and $R_4$ are all H. More preferably, $R_1$ is a direct bond or phenylene bound to $C_1$-$C_4$alkylene, O—$C_1$-$C_4$alkylene, C(=O)—$C_1$-$C_4$alkylene, CONH—$C_1$-$C_4$alkylene or COOC$_1$-$C_4$alkylene, $R_2$ is $C_1$-$C_{20}$alkyl, $R_3$ is $C_1$-$C_4$alkyl, phenyl, benzyl or [$C_2$-$C_4$alkylene—O]$_n$H, and $R_4$ is $C_1$-$C_4$alkyl, phenyl, benzyl or [$C_2$-$C_4$alkylene—O]$_n$H. These preferences apply each individually or in any combination with each other.

$C_1$-$C_{24}$Alkyl or $C_3$-$C_{24}$cycloalkyl can be straight-chain or branched, or monocyclic or polycyclic. Alkyl is, for example, methyl, straight-chain $C_2$-$C_{24}$alkyl or preferably branched $C_3$-$C_{24}$alkyl. $C_1$-$C_{24}$Alkyl is therefore, for example, methyl, ethyl, n-propyl, isopropyl, n-butyl, sec-butyl, isobutyl, tert-butyl, n-pentyl, 2-pentyl, 3-pentyl, 2,2-dimethylpropyl, n-hexyl, n-octyl, 1,1,3,3-tetramethylbutyl, 2-ethylhexyl, nonyl, decyl, dodecyl, tetradecyl, hexadecyl, octadecyl, eicosyl, heneicosyl, docosyl or tetracosyl. $C_3$-$C_{24}$Cycloalkyl is, for example, cyclopropyl, cyclobutyl, cyclopentyl, cyclohexyl, trimethylcyclohexyl, menthyl, thujyl, bornyl, 1-adamantyl, 2-adamantyl or a steroid radical.

$C_2$-$C_{24}$Alkenyl or $C_3$-$C_{24}$cycloalkenyl is $C_2$-$C_{20}$alkyl or $C_3$-$C_{24}$cycloalkyl that is mono- or poly-unsaturated, wherein two or more double bonds can be isolated or conjugated, for example vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl or the various isomers of hexenyl, octenyl, nonenyl, decenyl, dodecenyl, tetradecenyl, hexadecenyl, octadecenyl, eicosenyl, heneicosenyl, docosenyl, tetracosenyl, hexadienyl, octadienyl, nonadienyl, decadienyl, dodecadienyl, tetradecadienyl, hexadecadienyl, octadecadienyl or eicosadienyl.

Alkylene and cycloalkylene are aliphatic or alicyclic diradicals, whereby the two radicals can be on the same carbon atom or on any two different carbon atoms, preferably on the same carbon atomor on the two terminal carbon atoms, such as for example —C($CH_3$)$_2$— or —($CH_2$)$_3$— (2,2-propylene and 1,3-propylene, respectively).

$C_7$-$C_{12}$Aralkyl is, for example, benzyl, 2-benzyl-2-propyl, β-phenyl-ethyl, 9-fluorenyl, α,α-dimethylbenzyl, ω-phenyl-butyl or ω-phenyl-hexyl.

$C_6$-$C_{12}$Aryl is, for example, phenyl, naphthyl, biphenylyl or 2-fluorenyl.

In general, the whole quantity of the pigment and the main part, preferably at least 80%, most preferred from 95% to 100%, of the whole cationic pigment or cationic pigment derivative present within the cells is comprised in the aggregates, with essentially no pigment and only a minor part of the cationic pigment or cationic pigment derivative physically distinct from the aggregates. Free pigment leads to haze, a higher amount of free cationic pigment or cationic pigment derivative leads to the apparition of turbulences and to instability of the display.

An adequate method to prepare the aggregates is the co-dispersion of the pigment and the cationic pigment or cationic pigment derivative in an inert polar liquid, for example through wet-milling or high-speed mixing, at a temperature of from −20 to 200° C., preferably from −20 to 200° C., most preferred from 0 to 50° C., and isolation of the aggregates from the polar liquid. Adequate polar liquids have a dielectric constant $\epsilon$ of from 10 to 100, preferably from 30 to 80 (at 25° C.). Most suitable are hydrophilic polar liquids, such as water, mono- or polyalcohols, ketones, amides, sulfoxides and sulfones, preferably water.

At 25° C., the non-polar liquid in the cells has suitably a dielectric constant $\epsilon$ of from 0 to 20, preferably from 0 to 5, preferably from 0 to 3.2, a conductivity $\kappa$ of from 0 to 0.1 $S \cdot m^{-1}$, preferably from 0 to $10^{-2}$ $S \cdot m^{-1}$, especially from $10^{-16}$ to $10^{-8}$ $S \cdot m^{-1}$ and a transparency of from 90 to 100%, preferably from 95 to 100%, measured in a 1 cm thick quartz cell, at one wavelength in the range of from 400 to 700 nm. The same conductivity ranges are also valid for the whole content of the cells (dispersion). The non-polar liquid especially also has a dipole moment $\mu$ of from 0 to $10^{-18}$ esu, preferably from 0 to $3 \cdot 10^{-19}$ esu.

Examples of non-polar liquids include aromatic hydrocarbons, such as toluene, xylenes, or alkylbenzenes; aliphatic hydrocarbons such as pentane, hexane, octane, decane or dodecane; alicyclic hydrocarbons such as cyclohexane or methyl cyclohexane; halogenated hydrocarbons such as methylene chloride, chloroform, carbon tetrachloride, tetrachloroethylene or 1,2-dichloroethane; silicones; mineral oil such as silicon oil or fluorocarbon oil; vegetable oil such as olive oil and long-chain fatty acid esters. These non-polar liquids can be used alone or as mixtures. Examples of commercial mixtures are Isopar™ G, Isopar™ M and Halocarbon™ 0.8.

The liquid dispersion media can comprise the functionalized particles according to the present invention in an amount of 0.01 to 25% by weight, especially 0.1 to 10% by weight.

The instant monochrome particles are especially useful for the preparation of any type of electrophoretic displays ("electronic paper"), comprising for example one or two types of electrophoretically mobile particles, if applicable preferably of different, contrasting colours. The electrophoretic mobility and the dispersion stability of the instant monochrome particles are surprisingly high.

The monochrome particles are generally dispersed in the non-polar liquid with the help of the dispersant. The monochrome particles can be transparent or opaque, and black, white, or preferably coloured, for example red, blue, green, yellow, magenta or cyan. The instant cells can also comprise two or more kinds of monochrome particles, which can be of same or different colours, for example each two or more kinds of black, white, red, blue, green, yellow, magenta or cyan, or black or white together with red, blue, green, yellow, magenta or cyan monochrome particles. However, each particle is adequately homogeneously coloured—that is, shows the same colour independently from the direction of view.

Similarly, the electrophoretic display can comprise cells of identical or different composition, for example from one to eight types of cells each comprising monochrome particles of a single black, white, red, blue, green, yellow, magenta or cyan colour, or from one to six types of cells each comprising monochrome particles of black or white as well as of red, blue, green, yellow, magenta or cyan colour. Preferably, the electrophoretic display comprises cells all of identical composition or cells of from one to six colours black, white, red, blue, green, yellow, magenta or cyan, especially of three or four colours, such as red, blue, green and optionally black or white, or yellow, magenta and cyan. When the electrophoretic display comprises monochrome particles of different colours, it is generally suitable only the monochrome particles of one colour or those of colours of no more than 120° different hue angle according to the C.I.E. 1976 L*C*h color space to have the instant structure, while the monochrome particles of other colours, especially black or white monochrome particles, should have the reverse polarity.

Black anionic particles can be obtained, for example, by reacting carbon black (C. I. Pigment Black 7) with diazotated sulfanilic acid or other amino-substituted $C_6$-$C_{14}$-aryl compounds further comprising acidic groups. These groups may be attached through an azo group, or preferably they are let to dediazonate during the coupling reaction, leading to direct bonds to carbon black or other black chromophores. Alternatively, derivatives of organic black pigments can be used, such as for example sulfonates of perylenes. The counter ions are preferably quaternary ammonium cations, such as for example disclosed in PCT/EP2007/056 387 (page 8/line 4—page 9/line 5). C. I. Pigment Black 7 for use as anionic particles has preferably a particle size of from 30 nm to 1 μm, particularly preferred from 40 nm to 0.4 μm, most preferred from 50 nm to 0.2 μm. Depending on the respective optical densities, black anionic particles and coloured cationic particles are preferably used in a weight ratio of from 1:20 to 20:1, particularly preferred from 1:10 to 10:1, most preferred from 1:5 to 5:1.

The cells can be made in analogy to known methods. Preferred is a process for manufacturing cells comprising a skin, a non-polar liquid, a dispersant and at least one kind of ionic, monochrome particles dispersed into the non-polar liquid, wherein the ionic, monochrome particles of at least one kind are essentially aggregates consisting of a carbon containing pigment and a cationic pigment or cationic pigment derivative and the dispersant is selected from the group consisting of polyacrylates, polyesters, polyurethanes and copolymers, which process comprises the steps of (1) dispersing the ionic, monochrome particles of at least one kind into the non-polar liquid to form a suspension, (2) dispersing the suspension into a second liquid which is immiscible with the non-polar liquid to form droplets, and (3) generating the skin around the droplets through coacervation, emulsion polymerisation and/or emulsion polycondensation of one or more precursors preferably dissolved or dispersed into the second liquid. Coacervation is well-known in the art and described for example in U.S. Pat. No. 5,432,445, U.S. Pat. No. 5,460,817, US-2005/0 156 340 and US-2006/0 007 528. In-situ polymerisation methods are for example disclosed in WO-01/54 809 and WO-05/105 291. Precursors suitable for coacervation or to form polymeric layers and methods of forming polymeric layers are also well-known in the art. The second liquid is preferably aqueous.

Full colour transmissive displays (substractive, with back light or much preferably with a white reflector) preferably comprise the colours yellow, magenta and cyan arranged in layers on top of each other. On the other hand, full colour reflective displays (additive) preferably comprise the colours red, blue and green arranged side by side.

The cells contain suitably multiple particles, the number thereof depending on the particular embodiment. Each embodiment can be realized with cells constituted of compartments or of capsules. The only difference is that compartments are build directly on the electrophoretic display, while capsules are made separately, then coated onto the electrophoretic display. In each cell, the instant monochrome particles can be used alone, in combination together or in combination with any other electrophoretically mobile particles, preferably in combination with anionic black or white particles, especially such as disclosed in PCT/EP2007/056 387. There are two main embodiments, though the invention can of course also be performed in further, different ways.

In the first embodiment, the instant monochrome particles are transparent, with a weight average particle size of from 10 to 100 nm, preferably from 20 to 80 nm, most preferred from 30 to 60 nm. The number of particles per cell is generally from $10^2$ to $10^{15}$, preferably from $10^4$ to $10^{12}$. In this case, one electrode is arranged towards or on the side of the cell (pixel), while the other electrode is arranged parallel to the display's surface, both in a cut view perpendicular to the electrophoretic display. Such a construction is shown for example on FIG. 5B of US-A-2004/0 218 252. The non-polar liquid is preferably substantially colourless, with a transparency of from 90 to 100%, preferably from 95 to 100%, measured in a 1 cm thick quartz cell, in the whole range of from 400 to 700 nm. This embodiment can be used either as a reflective display above white reflective ground, or as a transmissive display with back light.

When a negative potential is applied to the electrode arranged towards or on the side of a pixel, the instant monochrome particles move to the side of the pixels and almost the whole, generally white light is transmitted through the pixel. When a positive potential is applied to the electrode arranged towards or on the side of a pixel is switched as the anode, the instant monochrome particles move to the other, negatively charged electrode and cover most of the pixel's surface, so that part of the visible light spectrum is absorbed by the monochrome particles and almost only the complementary colour is transmitted through the pixel.

In the second embodiment, the instant monochrome particles are opaque, with a weight average particle size of from 100 to 500 nm, preferably from 200 to 400 nm. The number of particles per cell is generally from $10^2$ to $10^8$, preferably from $10^3$ to $10^6$. In this case, both electrodes are arranged parallel to the display's surface, on opposite sides of the pixels, in a cut view perpendicular to the electrophoretic display. Such a construction is shown for example on for example on drawing 8 of JP-A-2003/330 179 (capsule), or on FIG. 8 of WO 2004/067 593 (compartment). When other monochrome particles of colour black, white or having a more than 120° different hue angle according to the C.I.E. 1976 L*C*h color space are also present, the non-polar liquid can be either coloured or colourless, but is preferably substantially colourless, with a transparency of from 90 to 100%, preferably from 95 to 100%, measured in a 1 cm thick quartz cell, in the whole range of from 400 to 700 nm. When no such additional monochrome particles are present, the non-polar liquid is on the contrary preferably coloured, with a transparency of from 0 to 20%, preferably from 0 to 10%, measured in a 1 cm thick quartz cell, at one wavelength in the range of from 400 to 700 nm.

When a negative potential is applied to the electrode arranged on the top of the pixel, the instant monochrome particles move to the top of the pixels and coloured light is reflected by the pixel. When a positive potential is applied to the electrode arranged on the top of the pixel, the instant monochrome particles move to the bottom, so that either light is reflected by the differently coloured particles of different polarity moving to the top of the pixels or by less mobile, reflective particles suspended in the medium, for example white or black particles, or the light reflected by the instant monochrome particles is absorbed by the colour of the non-polar liquid, leading to a colour change. For example, orange-red monochrome particles and a blue-green non-polar liquid would lead to an attractive switch from bright orange-red to dark brown. If the blue-green non-polar liquid would be replaced by less mobile, reflective green particles, it would be possible to switch the electrophoretic display from red to green.

Less mobile particles may be for example such as known previously, or just particles difficult to ionize, such as well dispersed pigments. However, as the charge of the instant particles can advantageously be controlled precisely, it is also possible to obtain less mobile particles by reducing the amount of cationic pigment or cationic pigment derivative in the aggregates. A combination of instant particles of different mobility could then for example be red, opaque monochrome particles comprising a red diketopyrrolopyrrole pigment and a relatively high amount of a diketopyrrolopyrrole derivative, and green, opaque monochrome particles comprising a green phthalocyanine pigment and a relatively low amount of a phthalocyanine derivative. Upon applying an electrical potential between the electrodes, the red particles move faster and reach the target electrode before the green particles.

The instant monochrome particles can if desired be embedded in a polymer. A suitable method therefor is for example to separate electrochemically the cations from easily dissociable counter anions, using methods are known per se, and then radically to polymerize a thin protective and insulating layer of polymer on the cationic pigment particles. The desired carboxylate, phenolate, sulfate, sulfonate, phosphate, phosphonate, antimonate, borate, halogenide, halogenate or hydroxide anions are preferably finally added in the form of their alkali or ammonium salts before the electrical field is removed.

The manufacture of compartments or capsules is well-known in the art. The capsules can be arranged on a support as homogeneous layer or pattern-wise by methods which are well-known in the art for the deposition of solid particles, for example methods used for toners in colour proofing, such as the Chromalin™ process described in DE 35 40 796 and EP 0 051 830. The process can be repeated if desired for multiple colour layers. The electrodes are made as needed by also well-known conventional methods. Capsules can alternatively for example be laminated onto a substrate.

Needless to say, the instant electrophoretic display can be either of the scattering or transmissive type, each either rigid or flexible if a flexible substrate is used.

The examples which follow illustrate the invention, without limiting it ("%" are by weight where not otherwise specified). For performing these examples, it is most adequate to use aqueous press cake comprising tiny transparent pigment particles, as can be obtained by many techniques which are per se well-known in the art, such as for example in the case of diketopyrrolopyrroles direct synthesis (EP-B-0 640 603), wet-milling (EP-B-1 358 275 or WO 2007/045 312) or kneading (WO 01/04 215), which examples are only illustrative and can be applied to other pigment classes.

EXAMPLE 1

45.6 g of a 43.8% aqueous press cake of C. I. Pigment Red 264 are dispersed in 200 ml of water. Separately, a solution of 5.5 g of procaine hydrochloride in 15 g of water and 7 ml of HCl is treated with 5.5 ml of 4M aqueous $NaNO_2$ solution at 0-4° C. The diazonium salt is added slowly to the pigment suspension. After stirring at 0-4° C. for 15 minutes, the suspension is stirred for one hour at 23° C. and then heated to 50° C. and further stirred for one hour. The formed salt is neutralized with an excess of stearic acid. The suspension is then filtered, washed with water and the product is dried at 80° C./$10^3$Pa.

EXAMPLE 2

It is proceeded as in example 1, with the difference that a presscake of C. I. Pigment Blue 15:3 is used instead of a presscake of C. I. Pigment Red 264.

EXAMPLE 3

It is proceeded as in example 1, with the difference that a presscake of C. I. Pigment Blue 15:1 is used instead of a presscake of C. I. Pigment Red 264.

EXAMPLE 4

63 g of a 31.5% aqueous press cake of C. I. Pigment Red 122 are dispersed in 180 ml of water. Separately, a solution of 5.5 g of procaine hydrochloride in 15 g of water and 7 ml of HCl is treated with 5.5 ml of 4M aqueous $NaNO_2$ solution at 0-4° C. The diazonium salt is added to the pigment suspension. After stirring at 60° C. for one hour, the formed salt is neutralized with an excess of stearic acid. The suspension is then filtered, washed with water and the product is dried at 80° C./$10^3$Pa.

EXAMPLE 5

It is proceeded as in example 4, with the difference that a presscake of C. I. Pigment Yellow 128 is used instead of a presscake of C. I. Pigment Red 122.

EXAMPLE 6

10 g of a micronized oxobenzofuranyliden-dihydroindolone (according to example 12B of WO 00/24 736) are dispersed in 100 ml of water for 18 hours. 0.7 g sulfanilic acid in 2.9 g water and 1.38 g of 35% hydrochloric acid are treated separately with 1.08 ml of 4M aqueous $NaNO_2$ solution at 4° C. The diazonium salt is added to the pigment suspension, stirred from 4° C. to 23° C. and then heated to 50° C. over one hour. Then, 0.4 g ARQUAD® MCB-50 (Akzo-Nobel) is added. After 30 minutes further agitation, the suspension is filtered, washed with water and the product is dried at 80° C./$10^3$Pa.

EXAMPLE 8

100 g of 4-benzyloxyphthalodinitrile, 52 g of urea, 14.4 g of anhydrous copper(II)chloride and 2 g of ammonium molybdate are mixed with 350 ml of nitrobenzene in a 1 l glass reactor. The reaction mixture is gradually heated from 80° C. to 140° C. in about 3-4 hours, then to 160° C. for another hour. After a total of 6 hours, the reaction mixture is cooled to 50° C., then 1000 ml of methanol are added and the reaction mixture is stirred vigorously for ½ hour and then filtered. The thus obtained green solid tetrahydroxy phthalocyanine is then washed with 200 ml of methanol followed by 1 l of water to remove any water-soluble impurities and finally with 500 ml of acetone to remove any colored impurities. 200 g (based on the dry solid contents) of this filter cake are dispersed in 200 ml of water. Separately, a solution of 5.5 g procaine hydrochloride in 15 g of water and 7 ml of 37% aqueous HCl are treated with 5.5 ml 4M aqueous $NaNO_2$ solution at 0-4° C. The thus formed diazonium salt is slowly added to the tetrahydroxy phthalocyanine suspension. After stirring at 0-4° C., the suspension is stirred at 23° C. for one hour and than heated to 50° C. for another hour. The salt is then neutralized with an excess of stearic acid. After cooling to 23° C., the suspension is filtered and the residue is washed with water and dried at 80° C./$10^3$ Pa.

EXAMPLE 9a

In a 5-liter glass reactor with stirrer, cooler, thermometer and monomer feed lines, 1304 g of n-butylacrylate and 72 g of the polymerization regulator of formula

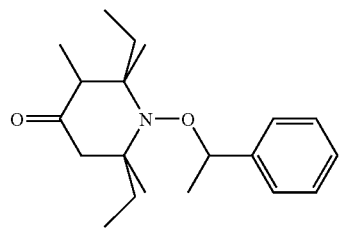

(II)

are mixed and degassed thoroughly by $N_2$/vacuum cycles. The mixture is heated to 115° C. within 1 hour, then kept for further 1 h at the same temperature. Within next 3.5 hours, 2800 g of n-butylacrylate are continuously fed to the reactor while the temperature raises to 128° C., at which temperature the mixture is kept for another 6 hours. 2011 g of a clear, viscous polymer are isolated by stripping off the non-reacted monomer under reduced pressure. GPC-analysis: $M_n$=8800 g/mol, PD=1.20. According to $^1$H-NMR, the degree of polymerization is 76.

EXAMPLE 9b

In the same reactor as in example 9a, 2000 g poly(n-BA) of the product according to example 9a and 505 g 4-vinylpyridine are mixed, degassed with $N_2$/vacuum cycles and polymerized at 125° C. for 5 hours. 2224 g of clear orange polymer are isolated by distilling off the residual monomers under reduced pressure. Due to its high viscosity, the diblock copolymer is diluted for further processing with 1483 g of propyleneglycol-monomethylether-acetate (MPA). GPC-analysis: $M_n$=8834 g/mol, PD=1.27. According to $^1$H-NMR, the degree of polymerization of the 4-vinylpyridine block is 14.

EXAMPLE 9c 83.3 g of the MPA-solution of the diblock copolymer according to example 9b and 55.3 g of a branched iso-$C_{12}$-$C_{15}$-alcohol mixture (Neodol® 25 E, Shell) are loaded in a 250 ml flask equipped with a magnetic stirring bar and a distillation column. After heating the mixture to 125° C., the MPA is distilled under reduced pressure before adding 0.28 g of a catalyst solution consisting of 75% by weight bis-acetylacetonato-titanium-bis-isopropylate in isopropanol. The transesterification is started by slowly distilling off n-butanol under reduced pressure and increasing the temperature to 145° C. Two additional portions each of 0.28 g catalyst solution are then added, the first after 1 hour and the second 2 hours later. After 4 hours total reaction time, the transesterification is terminated after no further n-butanol formation is observed. 78 g of a liquid block copolymer are obtained. Analysis via GPC ($M_n$=12465, PDI=1.33) as well as $^1$H-NMR indicates almost quantitative conversion of the branched iso-$C_{12}$-$C_{15}$-alcohol, with a ratio of n-butyl ester to iso-$C_{12}$-$C_{15}$ ester to pyridine groups of 16:60:14.

This liquid block copolymer dispersant can be replaced by similar ones obtainable according to WO 2006/074 969 or commercially available from EFKA.

EXAMPLES 10-22 illustrate the preparation of oil phases containing dispersed electrophoretic red, blue, green and black pigment particles.

EXAMPLE 10

A red electrophoretic dispersion is prepared by ultrasonically dispersing for 1½ h in a Bandelin® Sonorex® Super RH 102 H™ sonicator, at 25° C., 0.23 g of red charged particles according to example 1 into 10 ml of tetrachloroethylene (Riedel de Häen, d=1.622 g/cm$^3$) in the presence of 0.048 g of EFKA® 4300 (dispersant, EFKA additives). The diameter of the dispersed charged particles is measured by dynamic light scattering by means of a Malvern Zetasizer Nanoseries. The zeta potential ($\xi$) of the surface modified dispersed charged pigment particles is measured by means of a Malvern Zetasizer Nanoseries and the electrophoretic mobility $\mu$ is calculated from the Smoluchowsky relation ($\xi=\mu\eta/\epsilon$, where $\mu$ is the mobility, $\eta$=0.844 cP is the viscosity of the medium and $\epsilon$=2.6 is the dielectric constant).

EXAMPLE 11

A red electrophoretic dispersion is prepared by ultrasonically dispersing for 1½ h in a Bandelin® Sonorex® Super RH 102 H™ sonicator, at 25° C., 0.15 g of red charged particles according to example 1 into 10 ml of Isopar® G (Exxon Mobil, d=0.748 g/cm$^3$) in the presence of 0.0449 g of the liquid block copolymer according to example 9c. The diameter of the dispersed charged particles is measured by dynamic light scattering by means of a Malvern Zetasizer Nanoseries. The zeta potential ($\xi$) of the surface modified dispersed charged pigment particles is measured by means of a Malvern Zetasizer Nanoseries and the electrophoretic mobility $\mu$ is calculated from the Smoluchowsky relation ($\xi=\mu\eta/\epsilon$, where $\mu$ is the mobility, $\eta$=1.46 cP is the viscosity of the medium and $\epsilon$=2.0 is the dielectric constant).

EXAMPLE 12

A blue electrophoretic dispersion is prepared by ultrasonically dispersing for 1 h in a Bandelin® Sonorex® Super RH 102 H™ sonicator, at 25° C., 0.2 g of blue charged particles according to example 2 into 10 ml of tetrachloroethylene (Riedel de Häen, d=1.622 g/cm$^3$) in the presence of 0.045 g of EFKA® 4300 (dispersant, EFKA additives). The diameter of the dispersed charged particles is measured by dynamic light scattering by means of a Malvern Zetasizer Nanoseries. The zeta potential ($\xi$) of the surface modified dispersed charged pigment particles is measured by means of a Malvern Zetasizer Nanoseries and the electrophoretic mobility $\mu$ is calculated from the Smoluchowsky relation ($\xi=\mu\eta/\epsilon$, where $\mu$ is the mobility, $\eta$=1.844 cP is the viscosity of the medium and $\epsilon$=2.6 is the dielectric constant).

EXAMPLE 13

A blue electrophoretic dispersion is prepared by ultrasonically dispersing for 1½ h in a Bandelin® Sonorex® Super RH 102 H™ sonicator, at 25° C., 0.145 g of blue charged particles according to example 3 into 10 ml of Isopar® G (Exxon Mobil, d=0.748 g/cm$^3$) in the presence of 0.05 g of the liquid block copolymer according to example 9c. The diameter of the dispersed charged particles is measured by dynamic light scattering by means of a Malvern Zetasizer Nanoseries. The zeta potential ($\xi$) of the surface modified dispersed charged pigment particles is measured by means of a Malvern Zetasizer Nanoseries and the electrophoretic mobility $\mu$ is calculated from the Smoluchowsky relation ($\xi=\mu\eta/\epsilon$, where $\mu$ is the mobility, $\eta$=1.46 cP is the viscosity of the medium and $\epsilon$=2.0 is the dielectric constant).

EXAMPLE 14

A green electrophoretic dispersion is prepared by ultrasonically dispersing for 1 h min in a Bandelin® Sonorex® Super RH 102 H™ sonicator, at 25° C., 0.15 g of green charged particles according to example 8 into 10 ml of Isopar® G (Exxon Mobil, d=0.748 g/cm$^3$) in the presence of 0.040 g of the liquid block copolymer according to example 9c. The diameter of the dispersed charged particles is measured by dynamic light scattering by means of a Malvern Zetasizer Nanoseries. The zeta potential ($\xi$) of the surface modified dispersed charged pigment particles is measured by means of a Malvern Zetasizer Nanoseries and the electrophoretic mobility $\mu$ is calculated from the Smoluchowsky relation ($\xi=\mu\eta/\epsilon$, where $\mu$ is the mobility, $\eta$=1.46 cP is the viscosity of the medium and $\epsilon$=2.0 is the dielectric constant).

EXAMPLE 15

A black electrophoretic dispersion is prepared by ultrasonically dispersing for 1 h in a Bandelin® Sonorex® Super RH 102 H™ sonicator, at 25° C., 1 mg of black charged particles according to example 6 into 10 ml of tetrachloroethylene (Riedel de Häen, d=1.622 g/cm$^3$) in the presence of 50 mg of EFKA® 4300 (dispersant, EFKA additives).

EXAMPLE 16

55 ml of the red electrophoretic dispersion according to example 10 and 55 ml of the black electrophoretic dispersion according to example 15 are mixed by ultrasonically dispersing for 1 h at 25° C. in a Bandelin® Sonorex® Super RH 102 H™ sonicator.

EXAMPLE 17

55 ml of the blue electrophoretic dispersion according to example 12 and 55 ml of the black electrophoretic dispersion according to example 15 are mixed by ultrasonically dispersing for 1 h at 25° C. in a Bandelin® Sonorex® Super RH 102 H™ sonicator.

EXAMPLE 18

55 ml of the green electrophoretic dispersion according to example 14 and 55 ml of the black electrophoretic dispersion according to example 15 are mixed by ultrasonically dispersing for 1 h at 25° C. in a Bandelin® Sonorex® Super RH 102 H™ sonicator.

EXAMPLE 19

An aqueous phase is prepared by mixing 70 g of an 10% aqueous solution of ethylene-maleic anhydride copolymer (Zeeland Chemicals), 37.5 g of 70% melamine formaldehyde resin (Beetle Resin PT336, BIP Ltd) and 270 g of deionised water. This aqueous mixture is adjusted to pH 4.0 by addition of aqueous sodium hydroxide solution. The resulting aqueous phase is then transferred to a 1 litre reactor flask equipped with a turbine blade agitator and submerged in a thermostatic water bath. The agitator speed is increased to 1000 r.p.m., then 175 g of the oil phase according to example 16 is added to the aqueous phase to form an oil-in-water emulsion with oil droplets having a mean particle size diameter of about 30 μm, as estimated by means of a light microscope. Next, the agitator speed is reduced to 450 r.p.m. and the contents of the reactor flask slowly warmed to 40° C. to allow polycondensation reaction of the melamine formaldehyde resin to form the microcapsule shell. The temperature of the encapsulating mixture is maintained at 40° C. for further 2 hours and then increased to 60° C. to complete the microcapsule shell formation. The microcapsule suspension in water is then cooled to 23° C. and the pH of mixture adjusted to 8.0 with aqueous sodium hydroxide solution. Next, the microcapsules suspension in water is filtered and washed with water to remove residual impurities. The damp microcapsule cake contains 60% solids microcapsules having a melamine formaldehyde shell and an internal core containing the oil dispersion of the pigment particles. The capsules are dried at 30° C.

EXAMPLE 20

It is proceeded as in example 19, with the difference that the oil phase according to example 16 is replaced by the oil phase according to example 17.

EXAMPLE 21

It is proceeded as in example 19, with the difference that the oil phase according to example 16 is replaced by the oil phase according to example 18.

EXAMPLE 22

A 5% solution of a mixture of 2,6-dimethyl-4-(2'nitrophenyl)-1,4-dihydropyridine-3,5-dicarboxylic acid dimethylester (DHPM) and 2,6-dimethyl-4-(2'nitrophenyl)-1,4-dihydropyridine-3,5-dicarboxylic acid diethylester (DHPE) in methylethylketone (MEK) is spun on a substrate at 1000 r.p.m. for 30 s. This substrate is exposed with a UV exposing machine (Karl Süss MA 6) through a mask with 1 mW/cm$^2$ for 20 s. The red/black capsules of example 19 are then deposited on the substrate by means of dipping with a tampon. The overshoot of capsules is removed by putting the glass plate on a vibrating machine (Vortex Genie 2"). After this the substrate is treated with gazeous HCl in order to stop the tackiness of the exposed areas. This process is repeated twice with the blue/black and the green/black capsules of examples 20 and 21. At the end, the substrate is exposed uniformly for about 50 s and coated with a 20% polymethyl methacrylate solution in MEK on a spin coater at 1000 r.p.m. for 30 s and dried at 100° C. on a hotplate for 2-5 minutes.

EXAMPLE 23

10 g of a micronized oxobenzofuranyliden-dihydroxindolone (prepared according to example 12B of WO 00/24736) are dispersed in 100 ml of water overnight. Separately, a solution of 0.7 g procaine hydrochloride in 2.9 g water and 1.4 g of 35% hydrochloric acid are treated with 1.08 ml of 4M aqueous NaNO2 solution at 4° C. The thus formed diazonium salt is added to the pigment suspension, stirred from 4° C. to 23° C. and then heated to 55° C. over one hour. The salt is then neutralized with an excess of stearic acid. After cooling to 23° C., the suspension is filtered and the residue is washed with water and dried at 80° C./10$^3$ Pa.

The invention claimed is:

1. An electrophoretic display, comprising an electrode and a cell comprising at least one kind of ionic, monochrome particle, a non-polar liquid and a dispersant, wherein the ionic, monochrome particle of at least one kind is essentially an aggregate comprising a carbon pigment and a cationic pigment or cationic pigment derivative, and the dispersant is selected from the group consisting of polyacrylate, polyester, polyurethane and a copolymer, with the proviso that the cationic pigment or cationic pigment derivative is not a reaction product of carbon black with diazotated procaine hydrochloride.

2. An electrophoretic display according to claim 1, wherein the whole quantity of the pigment 80%, of the whole cationic pigment or cationic pigment derivative present within the cells is comprised in the aggregate, with essentially no pigment and only a minor part of the cationic pigment or cationic pigment derivative physically distinct from the aggregate.

3. An electrophoretic display according to claim 1, wherein the ionic, monochrome particle of at least one kind have a carboxylate as counter ion.

4. An electrophoretic display according to claim 1, wherein the dispersant comprises polar as well as an apolar or low polar ingredient preferably selected from the group consisting of an ingredient comprising a nitrogen atom and an ingredient comprising an aromatic ring.

5. An electrophoretic display according to claim 1, wherein the dispersant has an ionic group and the total number of ionic groups of the dispersant is equal to or lower than the total number of ionic groups of the cationic pigment or cationic pigment derivative, and the ratio of ionic groups of the cationic pigment or cationic pigment derivative to ionic groups of the dispersant is at least 1:1.

6. An electrophoretic display according to claim 1, wherein the amount of cationic pigment or cationic pigment derivative within the cells is from 0.1 to 15% by weight, calculated as protonated acid form based on the pigment.

7. An electrophoretic display according to claim 1, wherein the non-polar liquid has a dielectric constant ε of from 0 to 20, a conductivity κ of from 0 to 0.1 S·m$^{-1}$, and a transparency of from 90 to 100%, measured in a 1 cm thick quartz cell, at one wavelength in the range of from 400 to 700 nm.

8. An electrophoretic display according to claim 1, comprising at least 2 kinds of monochrome particles, at least one kind of monochrome particle consisting essentially of anionic black or white particles.

9. The electrophoretic of claim 4, wherein the apolar or low polar ingredient is selected from the group consisting of acrylic acid esters, methacrylic acid esters, allyl esters and vinyl esters, the ester group of which comprises from 1 to 24 carbon atoms and optionally from 1 to 12 oxygen and/or silicon atoms, allyl and vinyl $C_1$-$C_{24}$alkyl ethers, styrene, $C_1$-$C_{2-4}$alkyl-substituted styrenes, $C$—$C_{12}$lactones and hydroxy-$C_2$-$C_{24}$acids.

10. The electrophoretic display according to claim 1, wherein the amount of cationic pigment or cationic pigment derivative in the monochrome particles is from 0.1 to 15% by weight calculated as protonated acid form based on the pigment.

11. A method to prepare aggregates consisting of a pigment comprising carbon and a cationic pigment or cationic pigment derivative, comprising the co-dispersion of the pigment and the cationic pigment or cationic pigment derivative in an inert polar liquid, at a temperature of from −20 to 200° C., and isolation of the aggregates from the polar liquid, wherein the polar liquid has a dielectric constant $\epsilon$ of from 10 to 100, with the proviso that the cationic pigment or cationic pigment derivative is not a reaction product of carbon black with diazotated procaine hydrochloride.

12. A process for manufacturing cells comprising a skin, a non-polar liquid, a dispersant and at least one kind of ionic, monochrome particles dispersed into the non-polar liquid, wherein the ionic, monochrome particles of at least one kind are essentially aggregates consisting of a carbon pigment and a cationic pigment or cationic pigment derivative and the dispersant is at least one selected from the group consisting of polyacrylate, a polyester, a polyurethane, and a copolymer, comprising dispersing the ionic, monochrome particles of at least one kind into the non-polar liquid to form a suspension, dispersing the suspension into a second liquid which is immiscible with the non-polar liquid to form droplets, and generating the skin around the droplets through coacervation, emulsion polymerisation and/or emulsion polycondensation of one or more precursors preferably dissolved or dispersed into the second liquid, with the proviso that the cationic pigment or cationic pigment derivative is not a reaction product of carbon black with diazotated procaine hydrochloride.

13. A process according to claim 12, wherein there are at least 2 kinds of monochrome particles, at least one kind of monochrome particle consisting essentially of anionic black or white particles.

14. An electrophoretic display comprising monochrome particles which are essentially aggregates comprising a carbon pigment and a cationic pigment or cationic pigment derivative, with the proviso that the cationic pigment or cationic pigment derivative is not a reaction product of carbon black with diazotated procaine hydrochloride.

\* \* \* \* \*